United States Patent [19]

Ikeda et al.

[11] Patent Number: 4,818,387

[45] Date of Patent: Apr. 4, 1989

[54] SULFONATED POLYSULFONE COMPOSITE SEMIPERMEABLE MEMBRANES AND PROCESS FOR PRODUCING THE SAME

[75] Inventors: Kenichi Ikeda; Shouichi Yamamoto; Hiroki Ito, all of Osaka, Japan

[73] Assignee: Nitto Electric Industrial Co., Ltd., Osaka, Japan

[21] Appl. No.: 157,123

[22] Filed: Feb. 10, 1988

[30] Foreign Application Priority Data

Jun. 15, 1984 [JP] Japan .................. 59-124048
Jun. 15, 1984 [JP] Japan .................. 59-124049
Feb. 28, 1985 [JP] Japan .................. 60-40829

[51] Int. Cl.$^4$ ............................ B01D 13/00
[52] U.S. Cl. ............... 210/490; 210/500.41; 264/41
[58] Field of Search ........... 55/16, 158; 264/41; 210/490, 500.41

[56] References Cited

U.S. PATENT DOCUMENTS

| | | | |
|---|---|---|---|
| 4,071,454 | 1/1978 | Yamamoto et al. | 210/321 A |
| 4,214,020 | 7/1980 | Ward et al. | 55/16 X |
| 4,273,903 | 6/1981 | Rose | 210/500.2 X |
| 4,286,015 | 8/1981 | Yoshida et al. | |
| 4,454,176 | 6/1984 | Buckfelder et al. | 210/490 X |

FOREIGN PATENT DOCUMENTS 0031474 3/1980 Japan .................. 210/500.41

OTHER PUBLICATIONS

Kogyo, EP0086365, 8-1983, copy in 210-500.41.

Primary Examiner—Frank Spear
Attorney, Agent, or Firm—Sughrue, Mion, Zinn, Macpeak, and Seas

[57] ABSTRACT

A sulfonated polysulfone composite semipermeable membrane comprising a support membrane having laminated thereon in unity a semipermeable membrane composed of a sulfonated polysulfone formed by sulfonating a polysulfone composed of a recurring unit shown by formula (A)

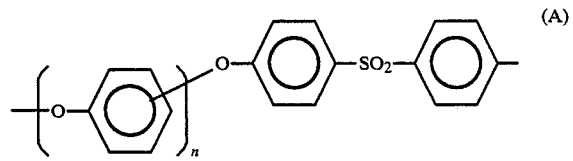

wherein n is an integer of 1 or more and process for producing the same.

26 Claims, No Drawings

SULFONATED POLYSULFONE COMPOSITE SEMIPERMEABLE MEMBRANES AND PROCESS FOR PRODUCING THE SAME

This is a continuation of application Ser. No. 745,210, filed 6-17-85, now abandoned.

FIELD OF THE INVENTION

This invention relates to a composite semipermeable membrane composed of a sulfonated polysulfone and a process for producing the same. More particularly, the invention relates to a composite semipermeable membrane comprising a semipermeable membrane composed of a sulfonated polysulfone formed on a ultrafiltration membrane as a support and a process for producing the same.

BACKGROUND OF THE INVENTION

A linear polysulfone copolymer having a recurring unit shown by formula (A)

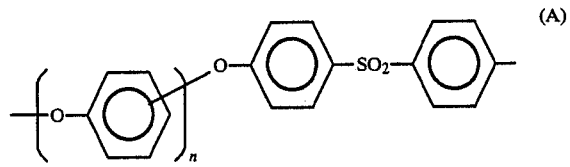

wherein n is an integer of 1 or more, and a recurring unit shown by formula (B)

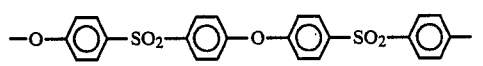

is already described in Japanese Patent Publication No. 21458/71 and the sulfonated product of the above-described copolymer is already described in Japanese Patent Application (OPI) No. 48222/80; the term "OPI" indicates an unexamined published patent application open to public inspection. That is, it is described in the above-described published specification that by sulfonating the above-described polysulfone copolymer by dissolved it in concentrated sulfuric acid, a hydrophilic sulfonated polysulfone wherein the recurring units shown by formula (A) are substantially wholly sulfonated but the recurring units shown by formula (B) wholly remain as a substantially un-sulfonated state.

Also, a sulfonated product of a polysulfone having a recurring unit shown by formula (C)

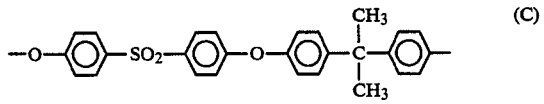

is described in U.S. Pat. No. 3,709,841. Furthermore, there is described a process of producing a composite semipermeable membrane for reverse osmosis composed of a thin membrane having semipermeability laminated on a ultrafiltration membrane by coating a solution of the above-described sulfonated polysulfone on a dense layer on the surface of an anisotropic ultrafiltration membrane and evaporating off the solvent in Japanese Patent Application Nos. 99973/75 and 146379/76. Similarly, there is described a process of obtaining a composite semipermeable membrane by previously filling the fine pores of an anisotropic ultrafiltration membrane having the recurring unit shown by above-described formula (C) with an aqueous solution of lactic acid, coating the ultrafiltration membrane with a solution of a sulfonated product of a polysulfone having the recurring unit shown by above-described formula (C), and then evaporating off the solvent in *Office of Water Research and Technology Department of the Interior*, Report No. 2001-20.

SUMMARY OF THE INVENTION

As the result of various investigations, the inventors have discovered that a composite semipermeable membrane can be obtained by sulfonating a polysulfone having the recurring unit shown by above-described formula (A) and forming a thin film-form semipermeable membrane of the sulfonated polysulfone on a support membrane and that the composite semipermeable membrane thus formed is particularly useful as a reverse osmosis membrane or a ultrafiltration membrane having excellent chlorine resistance and pH resistance.

The inventors have further discovered that a reverse osmosis membrane or a composite semipermeable membrane having very excellent properties and performance as compared to conventional composite semipermeable membranes as well as having, in a preferred case, the rejection of a very high sodium chloride in a treatment of an aqueous sodium chloride solution and also excellent pH resistance and heat resistance can be obtained by forming a film of a sulfonated polysulfone copolymer prepared by sulfonating a linear polysulfone copolymer having the recurring unit shown by above-described formula (A) and the recurring unit shown by above-described formula (B) on a ultrafiltration membrane as a support membrane.

Moreover, the inventors have discovered that in the case of producing a composite semipermeable membrane by forming a thin film-form semipermeable membrane composed of the above-described sulfonated polysulfone or sulfonated polysulfone copolymer on a ultrafiltration membrane as a support membrane, the properties of the composite semipermeable membrane thus obtained, in particular, the rejection of a solute in the membrane-forming treatment of the membrane-forming solution and the flux can be controlled in wide ranges by incorporating a certain water-soluble organic or inorganic compound in the membrane-forming solution containing the above-described polysulfone or polysulfone copolymer.

The invention has been attained based on these discoveries.

Thus, according to a first embodiment of this invention, there is provided a sulfonated polysulfone composite semipermeable membrane comprising a support membrane having laminated thereon in unity a semipermeable membrane composed of a sulfonated polysulfone formed by sulfonating a polysulfone comprising a recurring unit represented by formula (A)

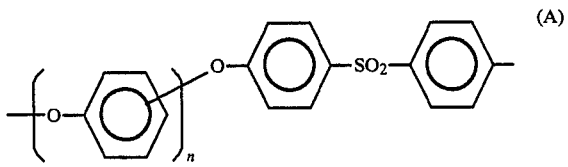

wherein n is an integer of 1 or more.

According to a second embodiment of this invention, there is provided a sulfonated polysulfone composite semipermeable membrane comprising a support membrane having laminated thereon in unity a semipermeable membrane comprising a recurring unit shown by above-described formula (A) and a recurring unit shown by formula (B)

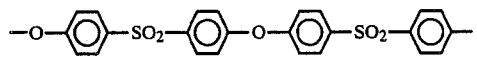

According to a third embodiment of this invention, there is provided a process for producing a sulfonated polysulfone composite semipermeable membrane which comprises coating a support membrane, preferably dried, with a membrane-forming solution containing a sulfonated polysulfone which is a polymer prepared by sulfonating a polysulfone comprising a recurring unit shown by formula (A)

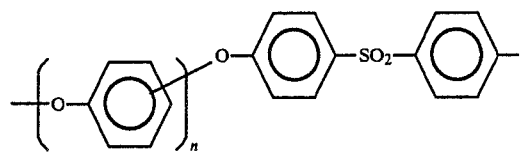

wherein n is an integer of 1 or more, and, preferably, has a logarithmic viscosity of 0.2 to 10 measured at 30° C. about the solution of 0.5 g of the polymer dissolved in 100 ml of N-methyl-2-pyrrolidone and an ion exchange capacity of 0.2 to 2.3 milli-equivalent/g, an alkylene glycol alkyl ether which may contain a small amount of a non-protonic polar organic solvent, and a water-soluble and low volatile compound as an additive, and then evaporating off the solvent from the membrane-forming solution thus coated.

According to a fourt embodiment of this invention, there is provided a process for producing a sulfonated polysulfone composite semipermeable membrane which comprises coating a support membrane, preferably dried, with a membrane-forming solution containing a sulfonated polysulfone copolymer which is a polymer (hereinafter, is referred to as a sulfonated polysulfone copolyer) prepared by sulfonating a linear polysulfone copolymer comprising a recurring unit shown by formula (A)

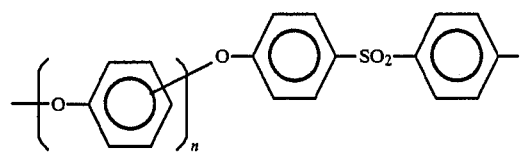

wherein n is an integer of 1 or more, and a recurring unit shown by formula (B)

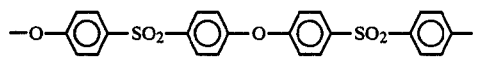

and, preferably, has a logarithmic viscosity of 0.2 to 10 measured at 30° C. about the solution of 0.5 g of the polymer in 100 ml of N-methyl-2-pyrrolidone and an ion exchange capacity of 0.2 to 2.3 milli-equivalent/g, an alkylene glycol alkyl ether which may contain a small amount of a non-protonic polar organic solvent, and a water-soluble and low-volatile compound as an additive, and then evaporating off the solvent from the membrane-forming solution thus coated.

DESCRIPTION OF THE PREFERRED EMBODIMENT

Then, the invention is explained in detail.

The sulfonated polysulfone for use in the process (the above-described third embodiment) of this invention is a hydrophilic polymer obtained by sulfonating the polysulfone having the recurring unit shown by above-described formula (A). The sulfonated polysulfone is obtained by adding the polysulfone having the recurring unit shown by aforesaid formula (A) in concentrated sulfuric acid of 97 to 98% in concentration and mildly stirring the mixture for several hours at room temperature. After the reaction is over, the viscous reaction mixture thus obtained is added to water and then the sulfonated polysulfone can be easily separated by filtration.

In this invention, it is necessary that the sulfonated polysulfone has a logarithmic viscosity of 0.2 to 10, preferably 0.5 to 8 measured at 30° C. about the solution of 0.5 g of the polymer dissolved in 100 ml of N-methyl-2-pyrrolidone. If the logarithmic viscosity is less than 0.2, the molecular weight of the sulfonated polysulfone is too small to form a uniform thin film having no defects such as pinholes, etc. Also, if the logarithmic viscosity is larger than 10, the viscosity of the membrane-forming solution becomes too high to form a film.

Furthermore, it is necessary that the above-described sulfonated polysulfone has an ion exchange capacity of 0.2 to 2.3, preferably 0.3 to 2.0 milli-equivalent per gram of the dry polymer.

When in a polysulfone composed of the recurring unit only shown by formula (A), all the aromatic rings each disposed between the two ether bonds are monosulfonated, the theoretical ion exchange capacity of such a sulfonated polysulfone is 2.4 milli-equivalent/g but in the sulfonated polysulfone for use in this invention, the aromatic rings are partially sulfonated.

If the ion exchange capacity is over 2.3 milli-equivalent/g, the sulfonated polysulfone has water solubility and hence is unsuitable for making a semipermeable membrane which is frequently used for treating liquids containing aqueous media. On the other hand, if the ion exchange capacity is less than 0.2 milli-equivalent/g, it sometimes happens that the effect of this invention is not obtained.

The sulfonated polysulfone copolymer for use in another process (above-described fourth embodiment) of this invention can be easily obtained by dissolving a linear polysulfone copolymer composed of the recurring unit shown by above-described formula (A) and the recurring unit shown by above-described formula (B) in concentrated sulfuric acid and mildly stirring the mixture for several hours at room temperature. In this case, the aromatic rings each disposed between the ether bonds in the recurring unit shown by formula (A) are substantially wholly monosulfonated but since the recurring units shown by formula (B) substantially wholly remain in non-sulfonated state, the extent of the sulfonation of the linear polysulfone can be easily controlled by changing the ratio of the recurring unit of formula (A) to the recurring unit of formula (B) in the copolymer.

In this invention, it is preferred that the linear polysulfone copolymer which is a precursor for the sulfonated polysulfone copolymer is composed of more than 10 mole% the recurring unit of formula (A) and less than 90 mole% the recurring unit of formula (B).

Also, in this invention, it is also necessary that the sulfonated polysulfone copolymer has the logarithmic viscosity of 0.2 to 10, preferably 0.5 to 8 (measured by the same manner as described above the above-described sulfonated polysulfone) as the case of the above-described sulfonated polysulfone. If the logarithmic viscosity is less than 0.2, the molecular weight of the sulfonated polysulfone copolymer is too small to form a uniform thin film having no defect such as pinholes. On the other hand, if the logarithmic viscosity is larger than 10, the viscosity of the membrane-forming solution is too high to form a film.

Also, it is necessary that the aforesaid sulfonated polysulfone copolymer has an ion exchange capacity of 0.2 to 2.3, preferably 0.3 to 2.0 milli-equivalent per gram of the dry polymer. If the ion exchange capacity of the sulfonated polysulfone capacity is over 2.3 milli-equivalent/g, the copolymer becomes water-soluble, which is unsuitable for making a semipermeable membrane which is frequently used for treating aqueous liquids. Also, if the ion exchange capacity is less than 0.2 milli-equivalent/g, it sometimes happens that the effect of this invention is not obtained.

The sulfonic acid group contained in the above-described sulfonated polysulfone or sulfonated polysulfone copolymer for use in the process of this invention is shown by formula $-SO_3M$, wherein M represents a hydrogen atom, an alkali metal, or a tetraalkyl ammonium group.

For example, when a polysulfone composed of the recurring unit shown by formula (A) is sulfonated and then the sulfonated polysulfone is washed with water and dried, a sulfonated polysulfone having a free sulfonic acid group can be obtained. Also, when the sulfonated polysulfone is treated by an aqueous solution, a methanol solution, an ethanol solution, etc., of an alkali metal hydroxide or an alkali metal alcoholate, the sulfonic acid group can be converted into an alkali metal salt. This is also applicable to the case of the sulfonated polysulfone copolymer. Examples of the above-described alkali metal hydroxide are sodium hydroxide, potassium hydroxide, lithium hydroxide, etc., and examples of the alkali metal alcoholate are sodium methylate, potassium methylate, potassium ethylate, etc.

Also, when the sulfonated polysulfone or sulfinated polsulfone copolymer is similarly treated with a solution of a tetraalkylammonium such as tetramethylammonium hydroxide, tetraethylammonium hydroxide, tetrapropylammonium hydroxide, tetrabutylammonium hydroxide, etc., the sulfonic group of the polymer can be converted into the corresponding tetraalkylammonium salt. The above sulfonic acid group occupies a large part of the total ion-exchange groups, preferably at least 70% and most preferably at least 90%. The remaining ion-exchange group can be an ion-exchange group other than the sulfonic acid group, such as carboxylic acid group, so long as the sulfonic acid group content per the total ion-exchange group is fallen within the above-described range.

The composite semipermeable membrane of the invention can be obtained by dissolving the above-described sulfonated polysulfone or sulfonated polysulfone copolymer and a water-soluble and low-volatile compound as an additive in an alkylene glycol alkyl ether which may contain a small amount of a non-protonic polar organic solvent to form a membrane-forming solution, coating a support membrane, preferably, dried with the membrane-forming solution, and then evaporating off the solvent from the coated membrane-forming solution.

As the organic solvent for preparing the membrane-forming solution, an alkylene glycol alkyl ether having an alkylene group of 2 to 4 carbon atoms and an alkyl group of 1 to 4 carbon atoms is particularly preferably used in this invention. This is because the solvent has an excellent dissolubility for both the sulfonated polysulfone and the sulfonated polysulfone copolymer for use in this invention and shows a high volatility as well as does not dissolve a polysulfone series ultrafiltration membrane which can be suitably used as a support membrane in this invention.

Specific examples of such an alkylene glycol alkyl ether are alkylene glycol monoalkyl ethers such as ethylene glycol monomethyl ether, methylene glycol monoethyl ether, propylene glycol monomethyl ether, propylene glycol monoethyl ether, etc., and alkylene glycol dialkyl ethers such as ethylene glycol dimethyl ether, ethylene glycol methylethyl ether, ethylene glycol diethyl ether, etc. In particular, ethylene glycol monomethyl ether is preferred in this invention since the solvent is excellent in dissolving power for the sulfonated polysulfone and the sulfonated polysulfone copolymer and shows a high volatility.

According to the nature of the sulfonated polysulfone or the sulfonated polysulfone copolymer for use in this invention, it sometimes happens that such a polymer is reluctant to be dissolved in the above-described alkylene glycol alkyl ether or is simplified swelled by the solvent but it has now been discovered that such a polymer is dissolved well in the aforesaid alkylene glycol alkyl ether when a small amount of a non-protonic polar organic solvent is added to the solvent. Preferred examples of the non-protonic polar organic solvent are dimethyl sulfoxide, N-methyl-2-pyrrolidone, N,N-dimethylformamide, N,N-dimethylacetamide, etc. It is preferred that the proportion of the non-protonic polar organic solvent in such a mixed solvent is less than 5 parts by weight, particularly less than 3 parts by weight per 100 parts by weight of the aforesaid alkylene glycol alkyl ether. If the proportion of the non-protonic polar organic solvent is larger than 5 parts by weight per 100 parts by weight of the aforesaid alkylene glycol alkyl ether, when the membrane-forming solution is coated on a dry polysulfone ultrafiltration membrane as a support membrane, the ultrafiltration membrane is dissolved in the solution or swelled by the solution, whereby a composite semipermeable membrane having good performance cannot be obtained.

The use of the mixed solvent of the alkylene glycol alkyl ether and a small amount of the foregoing non-protonic polar organic solvent as a solvent for the membrane-forming solution is advantageous since after coating a support membrane with the membrane-forming solution, substantially all the solvents can be removed at room temperature or by slight heating in the step of evaporating off the solvent from the coated membrane-forming solution as will be described hereinafter and also a uniform thin film having no defects can be formed.

The concentration of the sulfonated polysulfone or the sulfonated polysulfone copolymer in the membrane-forming solution depends upon the thickness of the semipermeable membrane composed of the copolymer in the composite semipermeable membrane thus obtained but is usually in the range of 0.05 to 10% by weight, preferably 0.1 to 5% by weight.

The membrane-forming solution in this invention contains specific additives. As one of these additives, at least one kind of organic solvent selected from polyhydric alcohols, polyalkylene glycols, carboxylic acids or the salts thereof, and hydroxycarboxylic acids or the salts thereof can be used. It is necessary that the organic compound as the additive is soluble in water and low volatile as well as is soluble in the membrane-forming solution. Thus, polyhydric alcohols having 2 to 5 carbon atoms, low molecular weight polyalkylene glycols, carboxylic acids or the salts thereof, and hydroxycarboxylic acids or the salts thereof can be preferably used. Specific examples of these organic additives are polyhydric alcohols such as ethylene glycol, propylene glycol, glycerol, 1,4-butanediol, etc.; polyalkylene glycols such as diethylene glycol, triethylene glycol, dipropylene glycol, etc.; carboxylic acids such as citric acid, oxalic acid, etc.; hydroxycarboxylic acids such as lactic acid, hydroxybutyric acid, etc.; and the salts of the carboxylic acids or the hydroxycarboxylic acids, such as, the sodium salts, potassium salts, etc.

Also, an inorganic salt which is soluble in water and soluble in the membrane-forming solution can be used as the additive in this invention. Examples of the inorganic salt are lithium chloride, lithium nitrate, magnesium perchloroate, etc.

The concentration of these additives in the membrane-forming solution is usually in the range of 0.1 to 80% by weight.

The function of the additives in the formation of the composite semipermeable membrane has not yet been clarified but it is considered the additive relates to the size of fine pores of the semipermeable membrane formed by the sulfonated polysulfone or the sulfonated polysulfone copolymer and also when the membrane-forming solution is coated on an ultrafiltration membrane as a support membrane, the solvent and the additive in the membrane-forming solution modify the surface of the ultrafiltration membrane. Thus, by suitably selecting the kind and the amount of the additive, the performance of the composite semipermeable membrane, in particular, the rejection of the solute and the flux can be controlled in wide ranges in this invention.

In the process of this invention, the membrane-forming solution thus prepared is then coated on a dried ultrafiltration membrane as a support membrane. The dry ultrafiltration membrane can be obtained by heating a wet ultrafiltration membrane prepared by a wet method.

As the materials for the support membranes in this invention, polymers having durability can be used without particular restriction but polysulfone series ultrafiltration membrane are particularly preferred. Specifically, there are ultrafiltration membranes composed of the polysulfone having the recurring units shown by aforesaid formula (B) or (C).

Particularly, the above-described support membrane showing a pure water flux of higher than 3 m$^3$/m$^2$.day, preferably higher than 5 m$^3$/m$^2$.day under a pressure of 3.5 kg/cm$^2$ can be preferably used.

In the process of this invention, an alkylene glycol alkyl ether or a mixture of an alkylene glycol alkyl ether and a small amount of the aforesaid non-protonic polar organic solvent is used as the solvent for the membrane-forming solution as described above and hence the solvent of the membrane-forming solution can be evaporated off after coating usually without need of heating or at substantially room temperature but after coating the membrane-forming solution on the support membrane, the membrane is, if necessary, heated for evaporating off the solvent. The heating temperature may be suitably selected according to the kind of the solvent used but the temperature lower than 150° C. are sufficient.

For accelerating the evaporation of the solvent after coating the membrane-forming solution on a support membrane, the membrane-forming solution may be previously heated before applying to the support membrane.

The thickness of the thin film-form semipermeable membrane composed of the sulfonated polysulfonic or the sulfonated polysulfone copolymer in the composite semipermeable membrane thus obtained depends upon the concentration of the polymer in the membrane-forming solution used and the coating thickness of the membrane-forming solution on the support membrane but is as thin as possible for increasing the flux of the composite semipermeable membrane and is as thick as possible for increasing the strength of the composite semipermeable membrane. Accordingly, although there is no particular restriction on the thickness of the semipermeable membrane composed of the sulfonated polysulfone or the sulfonated polysulfone copolymer, the thickness is preferably in the range of 0.01 to 5 μm.

According to the kind of additive(s) used, the additive(s) sometime remain in the composite semipermeable membrane thus obtained but these additives are removed from the membrane by immersing the composite semipermeable membrane in water and passing water through the membrane or by using the composite semipermeable membrane as it is for the treatment of an aqueous liquid.

The composite semipermeable membrane of this invention having the semipermeable membrane composed of the sulfonated polysulfone is particularly excellent in chlorine resistance and pH resistance and is suitable for use as a reverse osmosis membrane or a ultrafiltration membrane. Also, the composite semipermeable membrane of this invention having the semipermeable membrane composed of the sulfonated polysulfone copolymer is also excellent in chlorine resistance and pH resistance and is suitable for use as a reverse osmosis membrane. In particular, the composite semipermeable membrane obtained using the sulfonated product of the linear polysulfone copolymer wherein the recurring unit shown by formula (A) is in the range of 50 to 10 mole% and the recurring unit shown by formula (B) is in the range of 50 to 90 mole% shows a high rejection of sodium chloride by the treatment at low pressure and has a sufficiently large flux. Also, by applying, if necessary, the operation of drying and rewetting to the composite semipermeable membrane, the rejection thereof can be further increased.

Moreover, according to the process of this invention, the performance of the composite semipermeable membrane obtained, in particular, the rejection thereof for a solute and the flux can be controlled in wide ranges by properly selecting the kind and concentration of the additive(s) added to the membrane-forming solution and hence the planning of the composite semipermeable membrane suitable for desired use can be easily made.

Then, the following examples are intended to illustrate the present invention but not to limit it in any way.

In addition, the rejection of solute by the composite semipermeable membrane and the flux of the membrane are obtained by the following equations by treating an aqueous sodium chloride solution of a concentration of 5,000 ppm under the conditions of 25° C. in temperature and 20 kg/cm² in pressure.

Rejection = $(1-(a)/(b)) \times 100 (\%)$

Flux = $(c)(m^3)/[(d)(m^2) \times (e)(day)]$ wherein (a) is a concentration of the solute in the membrane permeated solution; (b) is a concentration of the feed solution; (c) is an amount of permeated solution; (d) is an effective membrane area; and (e) is a permeating period of time.

EXAMPLE 1

(1) Production of polysulfone:

A polysulfone having the recurring unit shown by formula ($A_1$)

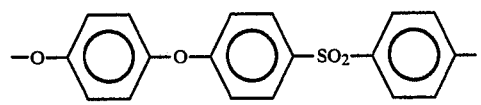

was prepared by the process described in Japanese Patent Publication No. 21458/71.

That is, 13.2 g (0.12 mole) of hydroquinone was placed in a flask equipped with a stirrer, a nitrogen gas inlet, a water outlet, and a thermometer and then 100 ml of sulforane and 50 ml of xylene were added thereto. The mixture was refluxed for one hour at 150° C. with stirring under heating by a mantle heater, during which about 3 ml of water was discharged.

Then, the temperature was reduced to 110° C. and then 34.5 g (0.12 mole) of 4,4'-dichlorodiphenylsulfone and 20.7 g (0.15 mole) of potassium carbonate were added to the mixture to initiate the polymerization reaction. After refluxing the mixture for 50 minutes at 150° C., the temperature was increased to 200° C. within a period of 50 minutes while withdrawing water and further the mixture was refluxed for 30 minutes at 200° to 215° C. The amount of the discharged water during the reaction was 3.6 ml.

After confirming that when a part of the reaction mixture was coated on a glass plate and immersed in water, it could form a film, 80 ml of sulforane was added to the reaction mixture and after lowering the temperature to 100° C., 20 ml of dichloromethane was added to the mixture. The reaction mixture thus obtained was poured in pure water to solidify polysulfone and the mixture was allowed to stand overnight. The polysulfone was separated, crushed by means of a mixer, and after washing with pure water and isopropyl alcohol, dried for 6 hours at 80° C.

The polysulfone thus obtained was russet granular materials and the logarithmic viscosity thereof measured at 47° C. about a solution of 0.5 g of the polymer in 100 ml of p-chlorophenol was 1.40. Hereinafter, the measurement conditions for the logarithmic viscosity of the polysulfone are the same.

(2) Production of sulfonated polysulfone:

To 80 ml of concentrated sulfuric acid of 97% in concentration was added 10 g of the polysulfone obtained as described above and the mixture was mildly stirred for 4 hours at room temperature to perform the reaction, whereby a black-brown viscous reaction mixture was obtained. The product was poured in ice bath to solidify the sulfonated polysulfone thus obtained, the sulfonated polysulfone was collected, washed with water and then allowed to stand overnight in 800 ml of an aqueous solution of 0.5N sodium hydroxide. Then, the polymer was collected, washed with water until the washings became neutral, and then dried in vacuo for 7 hours at 30° C.

The logarithmic viscosity of the light-yellow granular sulfonated polysulfone thus obtained was 3.0 and the ion exchange capacity thereof was 1.92 milliequivalent/g.

(3) Production of composite semipermeable membrane:

An anisotropic ultrafiltration membrane composed of the polysulfone having the recurring unit shown by the above-described formula (C) and having a pure water flux of 20 m³/m².day at a pressure of 3.5 kg/cm² was allowed to stand for 5 minutes in a dryer at 60° C. to provide a dry ultrafiltration membrane.

The above-described sulfonated polysulfone was dissolved in ethylene glycol monomethyl ether, foreign matters were removed using a filter paper of 10 μm in pore size to provide a polymer solution of 1.0% by weight in concentration, and further 10 g of 1,4-butanediol to 90 g of the solution followed by stirring to provide a homogeneous membrane-forming solution. The membrane-forming solution contained 0.9% by weight the sulfonated polysulfone and 10% by weight the additive.

The membrane-forming solution was coated on the above-described dry ultrafiltration membrane and after allowing to stand the ultrafiltration membrane to evaporating off almost all the solvent, the membrane was heated for 5 minutes at 60° C. to provide a composite semipermeable membrane having a semipermeable membrane of 0.3 μm in thickness.

The performance of the composite semipermeable membrane was 50.0% in rejection and 5.9 m³/m².day in flux.

EXAMPLE 2

By following the same procedure as Example 1 except that lactic acid was used as the additive and the concentration of lactic acid in the membrane-forming solution was 10% by weight, a composite semipermeable membrane was obtained. The rejection and the flux of the composite semipermeable membrane were 50.3% and 5.9 m³/m².day.

EXAMPLE 3

By following the same procedure as Example 1 except that 1,4-butanediol or glycerol was used as the additive at a concentration in the membrane-forming solution shown in Table 1, composite semipermeable membranes of this invention were obtained. The performances of the composite semipermeable membranes thus obtained are shown in Table 1.

TABLE 1

| Additive | Amount Added (wt %)* | Rejection (%) | Flux (m³/m² day) |
|---|---|---|---|
| 1,4-Butanediol | 5 | 65.0 | 3.2 |
| " | 10 | 49.7 | 5.1 |
| " | 30 | 31.2 | 8.4 |

TABLE 1-continued

| Additive | Amount Added (wt %)* | Rejection (%) | Flux (m³/m² day) |
|---|---|---|---|
| " | 70 | 20.6 | 11.4 |
| Glycerol | 2.5 | 28.9 | 7.4 |
| " | 10 | 14.1 | 13.0 |

*Concentration in the membrane-forming solution.

EXAMPLE 4

By following the same procedure as Example 1 using the additive shown in Table 2, composite semipermeable membranes were produced.

In the evaluation of the performances of these products thus obtained, a permeating test was performed at a temperature of 25° C. and a pressure of 20 kg/cm² using an aqueous sucrose solution at a concentration of 500 ppm as a base liquid. The results are shown in Table 2.

TABLE 2

| Additive | Amount Added (wt %)* | Rejection (%) | Flux (m³/m² day) |
|---|---|---|---|
| 1,4-Butanediol | 10 | 67.8 | 3.2 |
| " | 30 | 48.0 | 6.6 |
| " | 70 | 40.9 | 9.2 |
| Lactic Acid | 10 | 66.1 | 3.8 |
| Glycerol | 10 | 63.0 | 4.2 |

*Concentration in the membrane-forming solution.

EXAMPLE 5

[Acid resistance]

The semipermeable membrane obtained in Example 1 was immersed in distilled water for 2 hours and then in an aqueous 0.5N hydrochloric acid solution for 2 hours at 25° C., and thereafter, the membrane performance was measured about an aqueous sodium chloride solution under the same conditions as in Example 1. The rejection of the membrane was 50.0%, the flux thereof was 5.8 m³/m².day, which did not substantially differ from the case of without immersing the aqueous hydrochloric acid solution. Thus, it can be seen that the composite semipermeable membrane of this invention thus prepared is excellent in acid resistance.

[Alkali resistance]

The composite semipermeable membrane obtained in Example 1 was immersed in distilled water for 2 hours and then in aqueous 0.5N sodium hydroxide solution for 2 hours at 25° C., and then the membrane performance thereof was measured about an aqueous sodium chloride solution under the conditions as in Example 1. The rejection of the membrane was 50.0% and the flux thereof was 6.0 m³/m².day, which were substantially same as those of the membrane without immersing the aqueous sodium hydroxide solution. Thus, it can be seen that the composite semipermeable membrane of this invention is excellent in alkali resistance.

[Chlorine resistance]

The composite semipermeable membrane obtained in Example 3 using 1,4-butanediol in a concentration of 5% by weight was immersed in distilled water for 2 hours and then in an aqueous solution containing 100 ppm of chlorine for 4 weeks at 25° C. Thereafter, the membrane performance was measured about an aqueous sodium chloride solution under the same conditions as in Example 1. The rejection of the membrane was 67.0% and the flux thereof was 3.1 m³/m².day, which were substantially same as the composite semipermeable membrane without being immersed in the aqueous solution containing chlorine. Also, when the change of the performance of the composite semipermeable membrane with the passage of time for half a year was examined, no substantial change was observed.

After similarly immersing the composite semipermeable membrane in an aqueous solution having a chlorine concentration of 10,000 ppm for 4 weeks, the rejection was 68.0% and the flux was 3.0 m³/m².day.

Thus, it can be seen that the composite semipermeable membrane of this invention is excellent in chlorine resistance.

EXAMPLE 6

(1) Production of linear polysulfone copolymer:

According to the process described in Japanese Patent Publication No. 21458/71, a linear polysulfone copolymer composed of 57 mole% recurring unit shown by formula ($A_1$) and 43 mole% recurring unit shown by formula (B) was prepared.

That is, 15.0 g (0.06 mole) of 4,4'-dihydroxydiphenylsulfone and 8.8 g (0.08 mole) of hydroquinone were placed in a flask equipped with a stirrer, a nitrogen gas inlet, a water discharging pipe, and a thermometer and then 200 ml of sulforan and 100 ml of xylene were added thereto. Then, the mixture was refluxed for one hour at 155° C. while stirring under heating by means of a mantle heater, whereby 5.6 ml of water was discharged in this case.

Then, the temperature of the mixture was lowered to 110° C. and 40.2 g (0.14 mole) of 4,4'-dichlorodiphenylsulfone and 27.6 g (0.20 mole) of potassium carbonate were added thereto to initiate a polymerization reaction. After refluxing the mixture for one hour at 162° C., the temperature of the mixture was increased to 200° C. while withdrawing water during 2.5 hours and then the mixture was further refluxed for 4 hours at 200° to 215° C. During the reaction, 2.0 ml of water was withdrawn.

After confirming that when a part of the reaction mixture thus obtained was coated on a glass plate and the glass place was immersed in water, the reaction mixture could form a film, the temperature of the reaction mixture was lowered to 100° C. and 20 ml of dichloromethane was added thereto. The reaction mixture thus obtained was poured in pure water to solidify polysulfone copolymer thus formed. The copolymer was recovered, washed with pure water and then acetone, and dried for 6.5 hours at 80° C.

The linear polysulfone copolymer thus obtained was a light yellow granular material and the logarithmic viscosity thereof was 0.84.

(2) Production of sulfonated polysulfone copolymer:

To 80 ml of concentrated sulfuric acid of 97% in concentration was dissolved 10 g of the polysulfone copolymer obtained as described above and the solution was stirred for 4 hours at room temperature to cause a reaction, whereby a black-brown viscous reaction mixture was obtained. The product was poured in an ice bath to solidify the sulfonated polysulfone copolymer thus formed. After washing with water, the product was allowed to stand overnight in 800 ml of an aqueous 0.5N sodium hydroxide solution. Thereafter, the product was washed with water until the washings became neutral and then dried in vacuo for 5 hours at 60° C.

The logarithmic viscosity and the ion exchange capacity of the light-yellow granular sulfonated polysulfone copolymer thus obtained were 0.84 and 1.2 milli-equivalent/g, respectively.

(3) Production of composite semipermeable membrane:

The sulfonated polysulfone copolymer obtained as described above was dissolved in ethylene glycol monomethyl ether to provide a solution of 1.0% by weight of the copolymer and to 90 g of the solution was added glycerol so that the concentration thereof became 2.5% by weight followed by stirring to provide a homogeneous membrane-forming solution.

The membrane-forming solution was coated in a dry ultrafiltration membrane as used in Example 1 and after evaporating off almost all the solvent from the coating solution, the membrane was heated at 60° C. for about 5 minutes to provide a composite semipermeable membrane of this invention having a semipermeable film of 0.3 μm thickness.

The performance of the composite semipermeable membrane thus obtained was 82.0% in rejection and 2.5 $m^3/m^2$·day in flux.

EXAMPLE 7

By following the same procedure as Example 6 except that 1,4-butanediol was used as the additive and the concentration thereof in the membrane-forming solution was 10% by weight, a composite semipermeable membrane was obtained. The performance of the composite semipermeable membrane was 85.6% in rejection and 1.4 $m^3/m^2$·day in flux.

EXAMPLE 8

By following the same procedure as the case of preparing the polysulfone copolymer in Example 6, various polysulfone copolymers each having a different ratio of the recurring unit shown by formula ($A_1$) to the recurring unit shown by formula (B) were prepared, these copolymers were sulfonated to sulfonated polysulfone copolymers, composite semipermeable membrane were prepared by the same manner as in Example 6 using these sulfonated copolymers.

The performances of these composite semipermeable membranes are shown in Table 3.

thane were placed in a 200 milliliter Erlenmyer flask having a stop cock and 6 mol (0.16 mole) of sulfur trioxide was added thereto with stirring under cooling by an ice bath to provide a sulfur trioxide solution.

In a flask equipped with a stirrer, two dropping funnels, and a calcium chloride tube, the above-described polysulfone solution and sulfur trioxide solution were added dropwise through the dropping funnels, respectively, to the dichloroethane in the flask with stirring over a period of one hour, and then the mixture thus formed was further stirred for 2 hours at room temperature. The polymer thus deposited was collected by filtration, washed with isopropyl alcohol and then pure water, and then dried for 13 hours at 90° C.

The logarithmic viscosity of the sulfonated polysulfone copolymer thus obtained measured at 30° C. as a 0.15% by weight N-methyl-2-pyrrolidone solution thereof was 0.91 and the ion exchange capacity thereof was 1.0 milli-equivalent/g.

The sulfonated polysulfone was dissolved in ethylene glycol monomethyl ether to provide a membrane-forming solution having a concentration thereof of 1.0% by weight.

On the other hand, a wet ultrafiltration membrane as used in Example 1 was immersed in an aqueous 10% lactic acid solution without being dried and thereafter dried for 24 hours at room temperature to provide a dry ultrafiltration membrane.

The above-described membrane-forming solution was coated on the dry ultrafiltration membrane and a composite semipermeable membrane was obtained by the same manner as in Example 6.

The performance of the composite semipermeable membrane was 83.2% in rejection and 0.5 $m^3/m^2$·day in flux.

EXAMPLE 9

In a 1.0 wt% ethylene glycol monomethyl ether solution of the sulfonated product of the polysulfone copolymer composed of 43 mole% the recurring unit shown by formula ($A_1$) and 57 mole% the recurring unit shown by formula (B) obtained in Example 8 was dissolved glycerol or 1,4-butanediol in various concentrations to provide various membrane-forming solutions.

TABLE 3

| Composition of Polysulfone Copolymer (mole %) | | Sulfonated Polysulfone Copolymer | | Performance of Composite Semipermeable Membrane | |
|---|---|---|---|---|---|
| ($A_1$)* | (B)* | Viscosity** | Ion Exchange Capacity (milli-eq./g) | Rejection (%) | Flux ($m^3/m^2$·day) |
| 70 | 30 | 1.52 | 1.6 | 68.3 | 3.73 |
| 43 | 57 | 1.04 | 1.0 | 94.0 | 1.48 |
| 17 | 83 | 0.75 | 0.3 | 98.1 | 0.20 |

Note:
*The recurring unit of formula (A) and the recurring unit of formula (B).
**Logarithmic viscosity.

COMPARATIVE EXAMPLE 1

A polysulfone (P-1700, trade name, made by Union Carbide Corporation) having the recurring unit shown by formula (C) described before was sulfonated according to the method reported by A. Noshay et al in *Journal of Applied Polymer Science*, 20, 1885 (1976).

That is, 60 g of the above-described polysulfone was dissolved in 300 ml of 1,2-dichloroethane to provide a polysulfone solution. Apart from this, 11.5 ml (0.07 mole) of triethyl phosphate and 83 ml of 1,2-dichloroe- Then, composite semipermeable membranes were prepared using these membrane-forming solutions by the same manner as Example 6. The performance of the membranes are shown in Table 4.

TABLE 4

| Additive | Amount Added (wt %)* | Rejection (%) | Flux ($m^3/m^2$ day) |
|---|---|---|---|
| 1,4-Butanediol | 10 | 90.0 | 1.8 |
| " | 30 | 80.6 | 3.5 |

TABLE 4-continued

| Additive | Amount Added (wt %)* | Rejection (%) | Flux (m³/m² day) |
|---|---|---|---|
| " | 50 | 45.6 | 7.3 |
| " | 70 | 13.1 | 15.6 |
| Glycerol | 5 | 51.1 | 5.5 |
| " | 10 | 34.7 | 9.4 |
| " | 15 | 19.3 | 11.4 |
| " | 20 | 11.7 | 14.7 |

*Concentration in the membrane-forming solution.

EXAMPLE 10

By following the same procedure as Example 8 except that in the case of preparing a composite semipermeable membrane using a 1.0 wt% ethylene glycol monomethyl ether solution of the sulfonated product of the polysulfone copolymer composed of 43 mole% the recurring unit shown by formula ($A_1$) and 57 mole% the recurring unit shown by formula (B), the concentration of the copolymer in the membrane-forming solution was changed, composite semipermeable membranes were prepared. The performances of the composite semipermeable membranes thus obtained are shown in Table 5.

TABLE 5

| Concentration of Copolymer in Membrane-Forming Solution (wt %) | Rejection (%) | Flux (m³/m² day) |
|---|---|---|
| 5.0 | 46.9 | 5.7 |
| 1.0 | 38.9 | 7.6 |
| 0.5 | 42.1 | 8.2 |
| 0.1 | 21.0 | 10.2 |

EXAMPLE 11

In a mixed solvent composed of 99 g of ethylene glycol monomethyl ether and 1 g of N,N-dimethylformamide was dissolved 1 g of the sulfonated product of the polysulfone copolymer composed of 17 mole% the recurring unit shown by formula ($A_1$) and 83 mole% the recurring unit shown by formula (B) as obtained in Example 8 and after further adding thereto 2.5 g of glycerol, insoluble matters were removed using a filter paper of 10 μm in pore size to provide a homogeneous membrane-forming solution.

The membrane-forming solution thus formed was coated on a dry ultrafiltration membrane at a temperature of 25° C. by the same manner as in Example 6 and after evaporating off almost all the solvent at 25° C., the membrane was heated to 60° C. for 5 minutes to completely remove the solvent to provide a composite semipermeable membrane.

The performance of the composite semipermeable membrane thus obtained was 92.8% in rejection and 0.5 m²/m².day in flux.

EXAMPLE 12

By following the same procedure as Example 6 except that resercinol was used in place of hydroquinone, a polysulfone copolymer composed of 57 mole% a recurring unit shown by formula ($A_2$)

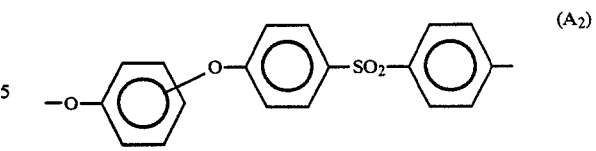

and 43 mole% a recurring unit shown by formula (B) was prepared. The polysulfone copolymer thus obtained was sulfonated by the same manner as in Example 6 to provide a sulfonated polysulfone copolymer. The logarithmic viscosity and the ion exchange capacity of the sulfonated polysulfone copolymer were 0.93 and 0.98 milli-equivalent/g, respectively.

A composite semipermeable membrane having a semipermeable membrane of 0.3 μm in film thickness was prepared using the sulfonated copolymer by the same manner as in Example 6. The performance of the composite semipermeable membrane was 90.3% in rejection and 1.8 m³/m².day in flux.

EXAMPLE 13

By following the same procedure as Example 6 except that catechol was used in place of hydroquinone, a polysulfone copolymer composed of 57 mole% a recurring unit shown by formula ($A_3$)

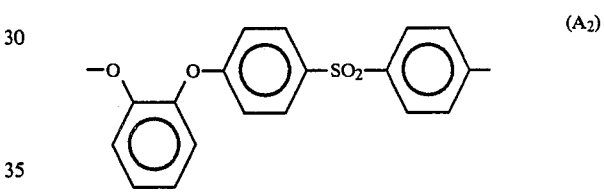

and 43 mole% a recurring unit shown by formula (B) was prepared and the copolymer thus obtained was sulfonated by the same manner as in Example 6. The logarithmic viscosity and the ion exchange capacity of the sulfonated polysulfone copolymer were 1.02 and 1.03 milli-equivalent/g, respectively.

Then, a composite semipermeable membrane having a semipermeable membrane of 0.3 μm in thickness was prepared using the sulfonated copolymer by the same manner as in Example 6. The performance of the composite semipermeable membrane was 90.1% in rejection and 1.8 m³/m².day in flux.

EXAMPLE 14

In concentrated sulfuric acid of 97% in concentration was dissolved 10 g of the polysulfone copolymer composed of 43 mole% the recurring unit shown by formula ($A_1$) and 57 mole% the recurring unit shown by formula (B) as obtained in Example 8 and the solution was stirred for 4 hours to cause reaction, whereby a black brown viscous reaction mixture was obtained. After the reaction was over, the reaction mixture thus obtained was poured in an ice bath to solidify the sulfonated copolymer, which was collected, washed with pure water until the washing became neutral, and dried for 7 hours at 60° C. to provide a sulfonated polysulfone copolymer having a logarithmic viscosity of 1.03 and an ion exchange capacity of 1.0 milli-equivalent/g.

In 99.5 g of ethylene glycol monomethyl ether was dissolved 1.0 g of the sulfonated polysulfone copolymer and further 2.5 g of glycerol was dissolved in the solution to provide a membrane-forming solution. Then, a composite semipermeable membrane was prepared using the membrane-forming solution by the same manner as in Example 6.

The performance of the composite semipermeable membrane was 90.3% in rejection and 1.7 m$^3$/m$^2$.day in flux.

EXAMPLE 15

[Evaluation of heat resistance]

Each of the composite semipermeable membrane obtained in Example 6 and the composite semipermeable membrane composed of 43 mole% the recurring unit shown by formula (A$_1$) and 57 mole% the recurring unit shown by formula (B) obtained in Example 8 was immersed in hot water of 95° C. for 30 minutes and thereafter, the rejection and the flux thereof were measured. Furthermore, the operation of immersing hot water for 30 minutes as above was repeated five times and the rejection and the flux were measured.

The results were as follows. That is, the performance of the composite semipermeable membrane in Example 6 was 82.0% in rejection and 2.5 m$^3$/m$^2$.day in flux before the hot water treatment and was 82.3 to 82.6% in rejection and 2.4 to 2.5 m$^3$/m$^2$.day in flux in the aforesaid hot water immersion of five times, which showed that the performance of the membrane did not substantially change during the hot water treatment.

Also, the performance of the composite semipermeable membrane in Example 8 was 94.0% in rejection and 1.5 m$^3$/m$^2$.day in flux before the hot water treatment and was 95.5 to 95.8% in rejection and 1.2 to 1.4 m$^3$/m$^2$.day in flux in the aforesaid hot water immersion of five times, which also showed that the performance thereof did not substantially change during the hot water treatment.

[Acid resistance]

The above-described composite semipermeable membrane in Example 8 was immersed in distilled water for 2 hours and then after further immersing the membrane in an aqueous 0.5N hydrochloric acid solution of 25° C. for 2 hours, the performance of the membrane about an aqueous sodium chloride solution was measured under the same conditions as in Example 1. The results are shown in Table 6.

TABLE 6

|  | Before Immersion of Treatment | | After Immersion of Treatment | |
| --- | --- | --- | --- | --- |
|  | (I)* | (II)** | (I)* | (II)** |
| Acid Resistance | 93.0 | 1.6 | 93.0 | 1.6 |
| Alkali Resistance | 92.8 | 1.2 | 93.0 | 1.2 |

Note:
*Rejection (%)
**Flux (m$^3$/m$^2$ day)

As shown in Table 6, it can be seen that the performance of the composite semipermeable membrane does not change before and after the immersion and hence the membrane is excellent in acid resistance.

[Alkali resistance]

The above-described composite membrane as in Example 8 was immersed in distilled water for 2 hours and then after further immersing the membrane in an aqueous 0.5N sodium hydroxide solution for 2 hours, the performance of the membrane was measured. The results are shown in Table 6 before.

As shown in the table, it can be seen that the performance of the membrane does not change before and after the immersion and hence the membrane is excellent in alkali resistance.

[Chlorine resistance]

The complete semipermeable membrane using 1,4-butanediol in a concentration of 10% by weight as obtained in Example 9 was immersed in distilled water for 2 hours and after immersing the membrane in an aqueous solution containing 100 ppm of chlorine for 4 weeks at 25° C., the performance of the membrane about an aqueous sodium chloride solution was measured under the same conditions as in Example 1. The rejection was 90.6% and the flux was 1.8 m$^3$/m$^2$.day, which were substantially same as those before the immersion.

Also, when the same test as above was performed using an aqueous solution containing 10,000 ppm of chlorine, the rejection was 88.3% and the flux was 2.2 m$^3$/m$^2$.day.

Furthermore, when the change in performance of the membrane with the passage of time was detected but no substantial change was observed. Thus, it can be seen that the composite semipermeable membrane of this invention is exellent in chlorine resistance.

[Drying resistance]

The composite semipermeable membrane using the polysulfone composition composed of 43 mole% recurring unit of formula (A$_1$) and 57 mole% recurring unit of formula (B) as obtained in Example 8 was immersed in distilled water for 2 hours, and after immersing the membrane in an aqueous 0.5N hydrochloric acid solution of 25° C. for 2 hours and then washing it with distilled water, the membrane was dried for 2 hours at 25° C. When the dry membrane was immersed in water to be re-wetted, the performance of the membrane was 99.5% in rejection and 0.3 m$^3$/m$^2$.day in flux.

REFERENCE EXAMPLE

When the polysulfone ultrafiltration membrane having the recurring unit shown by above-described formula (C) as used in Example 1 was used for treating an aqueous 0.5% sodium chloride solution at a temperature of 28° C. and a pressure of 20 kg/cm$^2$, the rejection was 0.2% and the flux was 17.1 m$^3$/m$^2$.day. However, when the ultrafiltration membrane was immersed in ethylene glycol monomethyl ether and dried for 6 minutes at 60° C., the performance of the membrane was 2.0% in rejection and 0.9 m$^3$/m$^2$.day in flux.

Also, when the above-described ultrafiltration membrane was immersed in the solution of ethylene glycol monomethyl ether involving 10% by weight of glycerol, and dried for 6 minutes at 60° C., the performance of the membrane was 0.8% in rejection and 9.3 m$^3$/m$^2$.day in flux.

EXAMPLE 16

By following the same procedure as Example 9 except that an anisotropic ultrafiltration membrane composed of a polysulfone having the recurring unit shown by formula (B) and showing a pure water flux of 20 m$^3$/m$^2$.day under a pressure of 3.5 kg/cm$^2$, composite semipermeable membranes were obtained.

The performances of these composite semipermeable membranes are shown in Table 7.

TABLE 7

| Additive | Amount Added (wt %)* | Rejection (%) | Flux (m³/m² day) |
|---|---|---|---|
| 1,4-Butanediol | 10 | 91.0 | 1.7 |
| " | 30 | 80.8 | 3.2 |
| " | 50 | 46.2 | 7.5 |
| " | 70 | 14.2 | 15.0 |
| Glycerol | 5 | 51.3 | 5.6 |
| " | 10 | 34.6 | 9.9 |
| " | 15 | 19.1 | 10.3 |
| " | 20 | 11.3 | 16.1 |

*Concentration in the membrane-forming solution.

EXAMPLE 17

(1) Production of polysulfone:

A linear polysulfone copolymer composed of 57 mole% of the recurring unit shown by formula ($A_1$)

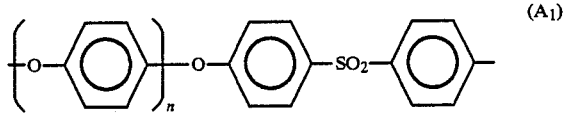

wherein n is an integer of 1 or more, and 43 mole% of the recurring unit shown by formula (B)

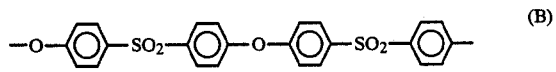

was prepared by the process described in Japanese Patent Publication No. 21458/71.

That is, 25.0 g (0.1 mole) of 4,4'-dihydroxyphenyl-sulfone was placed in a flask equipped with a stirrer, a nitrogen gas inlet, a water outlet and a thermometer and then 200 ml of sulforane and 100 ml of xylene were added thereto. The mixture was refluxed for one hour at 150° C. with stirring under heating by a mantle heater, during which about 5.3 ml of water was discharged.

Then, the temperature was reduced to 110° C. and then 28.8 g (0.1 mole) of 4,4'-dichlorodiphenylsulfone and 10.3 g (0.08 mole) of potassium carbonate were added to the mixture to initiate the polymerization reaction. After refluxing the mixture for 1 hour at 162° C., the temperature was increased to 200° C. within a period of 2.5 hours while withdrawing water and further the mixture was refluxed for 4 hours at 200° to 215° C. The amount of the discharged water during the reaction was 2.0 ml.

After confirming that when a part of the reaction mixture was coated in a glass plate and immersed in water, it could form a film, the temperature was lowered to 100° C. and 20 ml of dichloromethane was added to the mixture. The reaction mixture thus obtained was poured in pure water to solidify polysulfone. After washing with pure water and then acetone, the polysulfone was dried for 6.5 hours at 80° C.

The linear polysulfone thus obtained was light-yellow granular materials and the logarithmic viscosity thereof was 0.90.

(2) Production of sulfonated polysulfone:

To 80 ml of concentrated sulfuric acid of 97% in concentration was added 10 g of the polysulfone obtained as described above and the mixture was mildly stirred for 4 hours at room temperature to perform the reaction, whereby a black-brown viscous reaction mixture was obtained. The product was poured in ice bath to solidify the sulfonated polysulfone thus obtained, the sulfonated polysulfone was collected, washed with water and then allowed to stand overnight in 800 ml of an aqueous solution of 0.5N sodium hydroxide. Then, the polymer was collected, washed with water until the washings became neutral, and then dried in vacuo for 5 hours at 60° C.

The logarithmic viscosity of the light-yellow granular sulfonated polysulfone thus obtained was 1.03 and the ion exchange capacity thereof was 1.0 milli-equivalent/g.

(3) Production of composite semipermeable membrane:

By following the same procedure as Example 6 except that the sulfonated polysulfine obtained above was used, a composite semipermeable membrane was obtained.

The performance of the composite semipermeable membrane thus obtained was 83.3% in rejection and 2.3 m³/m².day in flux.

EXAMPLE 18

By following the same procedure as Example 9 except that the sulfonated polysulfone obtained in Example 17 above was used, composite semipermeable membranes of this invention were obtained. The performances of the composite semipermeable membranes thus obtained are shown in Table 8.

TABLE 8

| Additive | Amount Added (wt %)* | Rejection (%) | Flux (m³/m² day) |
|---|---|---|---|
| 1,4-Butanediol | 10 | 90.0 | 1.7 |
| " | 30 | 83.0 | 3.4 |
| " | 50 | 43.3 | 7.0 |
| " | 70 | 15.6 | 16.0 |
| Glycerol | 5 | 50.8 | 5.5 |
| " | 10 | 38.0 | 10.3 |
| " | 15 | 20.4 | 11.0 |
| " | 20 | 10.1 | 18.8 |

*Concentration in the membrane-forming solution.

While the invention has been described in detail and with reference to specific embodiments thereof, it will be apparent to one skilled in the art that various changes and modifications can be made therein without departing from the spirit and scope thereof.

What is claimed is:

1. A sulfonated polysulfone composite semipermeable membrane from reverse osmosis or ultrafiltration having a pure water flux of higher than 3 m³/m².day under a pressure of 3.5 kg/cm² and comprising polysulfone series ultrafiltration support membrane having laminated thereon in unity a 0.01 to 5 μm semipermeable membrane composed of a sulfonated polysulfone formed by sulfonating a polysulfone composed of a recurring unit shown by formula (A)

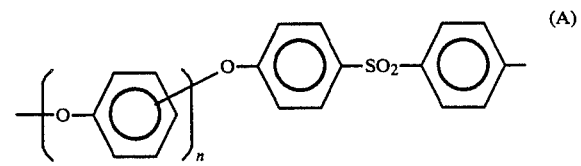

wherein n is an integer of 1 or more.

2. The polysulfone semipermeable membrane as claimed in claim 1, wherein the sulfonated polysulfone has a logarithmic viscosity of 0.2 to 10 measured at 30°

C. about a solution of 0.5 g thereof dissolved in 100 ml of N-methyl-2-pyrrolidone and an ion exchange capacity of 0.2 to 2.3 milli-equivalent/g.

3. The polysulfone semipermeable membrane as claimed in claim 1, wherein the sulfonated polysulfone has a sulfonic acid group represented by the formula —SO$_3$M (wherein M represents a hydrogen atom, an alkali metal or a tetraalkyl ammonium).

4. A process for producing a sulfonated polysulfone composite semipermeable membrane for reverse osmosis or ultrafiltration having a pure water flux of higher than 3 m$^3$/m$^2$.day under a pressure of 3.5 kg/cm$^2$ and which comprises coating a support membrane with a membrane-forming solution containing a sulfonated polysulfone formed by sulfonating a polysulfone composed of a recurring unit shown by formula (A)

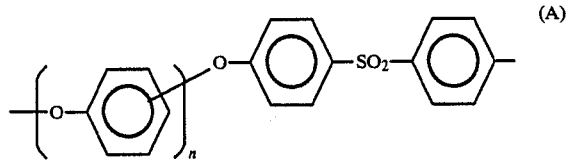

wherein n is an integer of 1 or more, an alkylene glycol alkyl ether which may contain a small amount of a non-protonic polar organic solvent, and a water-soluble and low volatile compound as an additive and then evaporating off the solvent from the coated membrane-forming solution.

5. The process for producing a sulfonated polysulfone composite semipermeable membrane as claimed in claim 4, wherein the sulfonated polysulfone has a logarithmic viscosity of 0.2 to 10 measured at 30° C. about a solution of 0.5 g thereof dissolved in 100 ml of N-methyl-2-pyrrolidone and has an ion exchange capacity of 0.2 to 2.3 milli-equivalent/g.

6. The process for producing a sulfonated polysulfone composite semipermeable membrane as claimed in claim 4, wherein the sulfonated polysulfone has a sulfonic acid group represented by the formula —SO$_3$M (wherein M represents a hydrogen atom, an alkali metal, or a tetraalkyl ammonium).

7. The process for producing a sulfonated polysulfone composite semipermeable membrane as claimed in claim 4, wherein the additive is at least one of polyhydric alcohols, polyalkylene glycols, carboxylic acids, the salts of carboxylic cid, hydroxycarboxylic acids, and the salts of hydroxycarboxylic acids.

8. The process for producing a sulfonated polysulfone composite semipermeable membrane as claimed in claim 4, wherein the additive is at least one of inorganic salts.

9. The process for producing a sulfonated polysulfone composite semipermeable membrane as claimed in claim 4, wherein the support membrane is a polysulfone series ultrafiltration membrane.

10. The process for producing a sulfonated polysulfone composite semipermeable membrane as claimed in claim 4, wherein the concentration of the additive in the membrane-forming solution is from 0.1 to 80% by weight.

11. A sulfonated polysulfone composite semipermeable membrane for reverse osmosis or ultrafiltration having a pure water flux of higher than 3 m$^3$/m$^2$.day under a pressure of 3.5 kg/cm$^2$ and comprising a polysulfone series filtration support membrane having laminated thereon in unity a 0.01 to 5 μm semipermeable membrane composed of a sulfonated polysulfone copolymer formed by sulfonating a linear polysulfone copolymer composed of a recurring unit shown by formula (A)

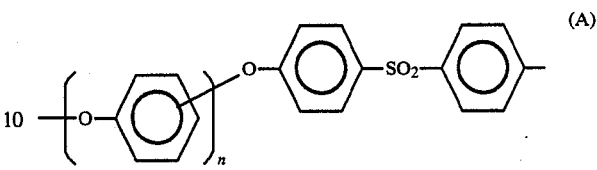

wherein n is an integer of 1 or more, and a recurring unit shown by formula (B)

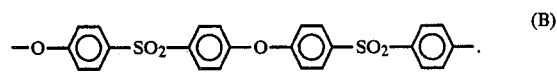

12. The sulfonated polysulfone composite semipermeable membrane as claimed in claim 11, wherein the linear polysulfone copolymer is composed of more than 10 mole% of the recurring unit of formula (A) and less than 90 mole% the recurring unit shown by formula (B).

13. The sulfonated polysulfone composite semipermeable membrane as claimed in claim 11, wherein the sulfonated polysulfone copolymer has a logarithmic viscosity of 0.2 to 10 measured at 30° C. about a solution of 0.5 g thereof dissolved in 100 ml of N-methyl-2-pyrrolidone and has an ion exchange capacity of 0.2 to 2.3 milli-equivalent/g.

14. The sulfonated polysulfone composite semipermeable membrane as claimed in claim 11, wherein the sulfonated polysulfone copolymer has a sulfonic acid group shown by the formula —SO$_3$M (wherein M represents a hydrogen atom, an alkali metal, or a tetraalkyl ammonium).

15. A process for producing a sulfonated polysulfone composite semipermeable membrane for reverse osmosis or ultrafiltration having a pure water flux of higher than 3 m$^3$/m$^2$.day under a pressure of 3.5 kg/cm$^2$ and which comprises coating a support membrane with a membrane-forming solution containing a sulfonated polysulfone copolymer formed by sulfonating a linear polysulfone copolymer composed of recurring unit shown by formula (A)

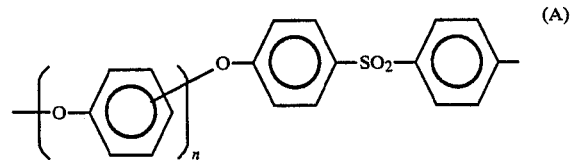

wherein n is an integer of 1 or more, and a recurring unit shown by formula (B)

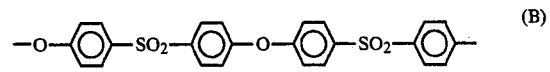

an alkylene glycol alkyl ether which may contain a small amount of a non-protonic polar organic solvent, and a water-soluble and low volatile compound as an additive and then evaporating off the solvent from the coated membrane-forming solution.

16. The process for producing a sulfonated polysulfone composite semipermeable membrane as claimed in claim 15, wherein the linear polysulfone copolymer is composed of more than 10 mole% of the recurring unit of formula (A) and less than 90 mole% of the recurring unit of formula (B).

17. The process for producing a sulfonated polysulfone composite semipermeable membrane as claimed in claim 15, wherein the sulfonated polysulfone copolymer has a logarithmic viscosity of 0.2 to 10 measured at 30° C. about a solution of 0.5 g thereof dissolved in 100 ml of N-methyl-2-pyrrolidone and has an ion exchange capacity of 0.2 to 2.3 milli-equivalent/g.

18. The process for producing a sulfonated polysulfone composite semipermeable membrane as claimed in claim 15, wherein the sulfonated polysulfone copolymer has a sulfonic acid group shown by the formula —$SO_3M$ (wherein M represents a hydrogen atom, an alkali metal, or a tetraalkyl ammonium).

19. The process for producing a sulfonated polysulfone composite semipermeable membrane as claimed in claim 15, wherein the additive is at least one of polyhydric alcohols, polyalkylene glycols, carboxylic acids, the salts of carboxylic acids, hydroxycarboxylic acis, and the salts of hydroxycarboxylic acids.

20. The process for producing a sulfonated polysulfone composite semipermeable membrane as claimed in claim 15, wherein the additive is at least one of inorganic salts.

21. The process for producing a sulfonated polysulfone composite semipermeable membrane as claimed in claim 15, wherein the support membrane is a polysulfone series ultrafiltration membrane.

22. The process for producing a sulfonated polysulfone composite semipermeable membrane as claimed in claim 15, wherein the concentration of the additive in the membrane-forming solution is from 0.1 to 80% by weight.

23. A process for producing a sulfonated polysulfone composite semipermeable membrane which comprises coating a support membrane with a membrane-forming solution containing a sulfonated polysulfone formed by sulfonating a polysulfone composed of a recurring unit shown by formula (A)

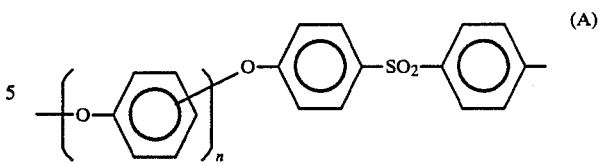

wherein n is an integer of 1 or more, an alkylene glycol alkyl ether which contains a small amount of a non-protonic polar organic solvent, and a water-soluble and low volatile compound as an additive and then evaporating off the solvent from the coated membrane-forming solution.

24. The process for producing a sulfonated polysulfone composite semipermeable membrane as claimed in claim 23, wherein said solution contains the non-protonic polar organic solution in a proportion of the non-protonic polar organic solvent in a mixed solvent of less than 5 parts by weight.

25. A process for producing a sulfonated polysulfone composite semipermeable membrane which comprises coating a support membrane with a membrane-forming solution containing a sulfonated polysulfone copolymer formed by sulfonating a linear polysulfone copolymer composed of a recurring unit shown by formula (A)

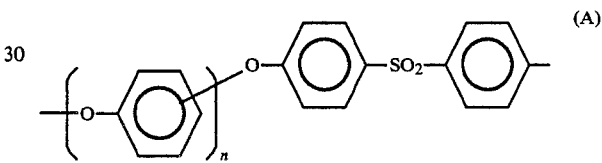

wherein n is an integer of 1 or more, and a recurring unit shown by formula (B)

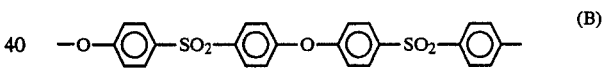

an alkylene glycol alkyl ether which contains a small amount of a non-protonic polar organic solvent, and a water-soluble and low volatile compound as an additive and then evaporating off the solvent from the coated membrane-forming solution.

26. The process for producing a sulfonated polysulfone composite semipermeable membrane as claimed in claim 25, wherein said solution contains the non-protonic polar organic solution in a proportion of the non-protonic polar organic solvent in a mixed solvent of less than 5 parts by weight.

* * * * *